(12) United States Patent
Shaneour et al.

(10) Patent No.: US 8,029,376 B2
(45) Date of Patent: Oct. 4, 2011

(54) SHOCK ABSORBING ATHLETIC FIELD AND METHOD OF CONSTRUCTING SAME

(76) Inventors: Dwight C. Shaneour, Hillsdale, MI (US); Evan J. Parry, Venice, FL (US); Darryl B. Chadwick, St. Catherines (CA)

(*) Notice: Subject to any disclaimer, the term of this patent is extended or adjusted under 35 U.S.C. 154(b) by 91 days.

(21) Appl. No.: 12/557,069

(22) Filed: Sep. 10, 2009

(65) Prior Publication Data
US 2010/0104779 A1    Apr. 29, 2010

Related U.S. Application Data

(63) Continuation-in-part of application No. 12/260,380, filed on Oct. 29, 2008, now abandoned.

(51) Int. Cl.
*A63C 19/04* (2006.01)
*A63C 19/00* (2006.01)

(52) U.S. Cl. ............................................. 472/92; 405/49

(58) Field of Classification Search ............. 472/85–92, 472/136; 482/15, 17, 85, 87, 95; 405/36, 405/43, 45, 49
See application file for complete search history.

(56) References Cited

U.S. PATENT DOCUMENTS

| | | | |
|---|---|---|---|
| 3,395,625 A | 8/1968 | Blanchette et al. | |
| 3,661,687 A | 5/1972 | Spinney, Jr. et al. | |
| 4,679,963 A | 7/1987 | Heath | |
| 4,948,116 A | 8/1990 | Vaux | |
| 5,514,722 A | 5/1996 | De Geronimo | |
| 5,853,265 A | 12/1998 | Gunter | |
| 6,796,096 B1 | 9/2004 | Heath | |
| 6,802,668 B2 * | 10/2004 | Parker | 405/49 |
| 7,758,281 B2 | 7/2010 | Knox | |
| 2003/0092531 A1 | 5/2003 | Daluise | |
| 2005/0048225 A1 | 3/2005 | Morris et al. | |
| 2010/0105492 A1 | 4/2010 | Shaneour et al. | |

* cited by examiner

*Primary Examiner* — Kien Nguyen
(74) *Attorney, Agent, or Firm* — Young Basile Hanlon & MacFarlane PC

(57) ABSTRACT

An athletic field is constructed using side-by-side conjoined layers of resilient synthetic material placed over a drain blanket and extending to a peripheral trench drain. The primary material construction is a rollable layer approximately 4 feet wide by 200 feet long comprising a dimpled polyethylene core material with bonded top and bottom thin, flexible geotechnic fabric layers. A flange and flap system along one edge receives the opposite edge of the joining strip to bond the laterally adjoining layers together in a shingling or tiered manner to promote drainage and to keep water out of the resilient pliable structure. The top surface is overlaid with artificial turf.

5 Claims, 3 Drawing Sheets

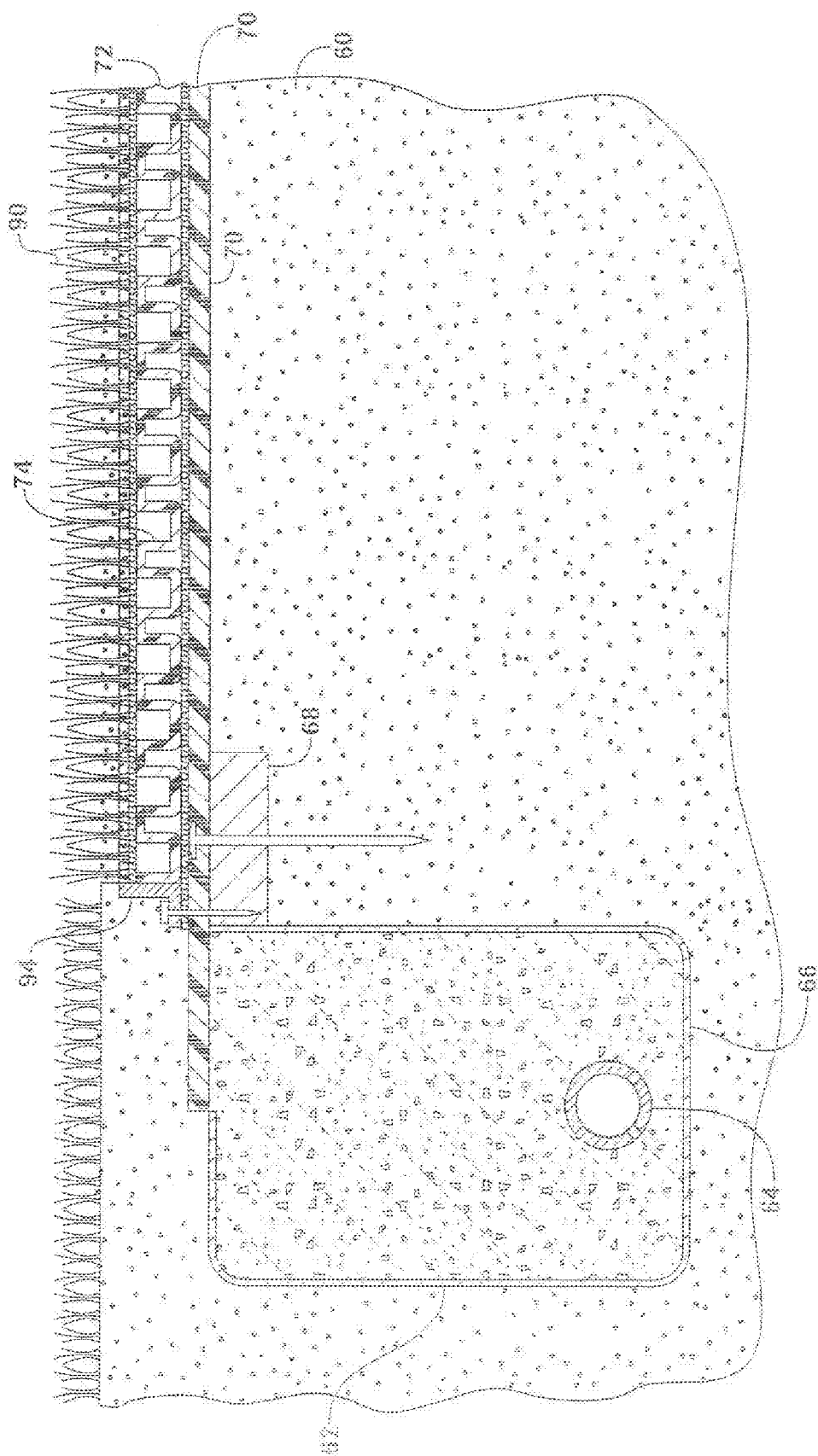

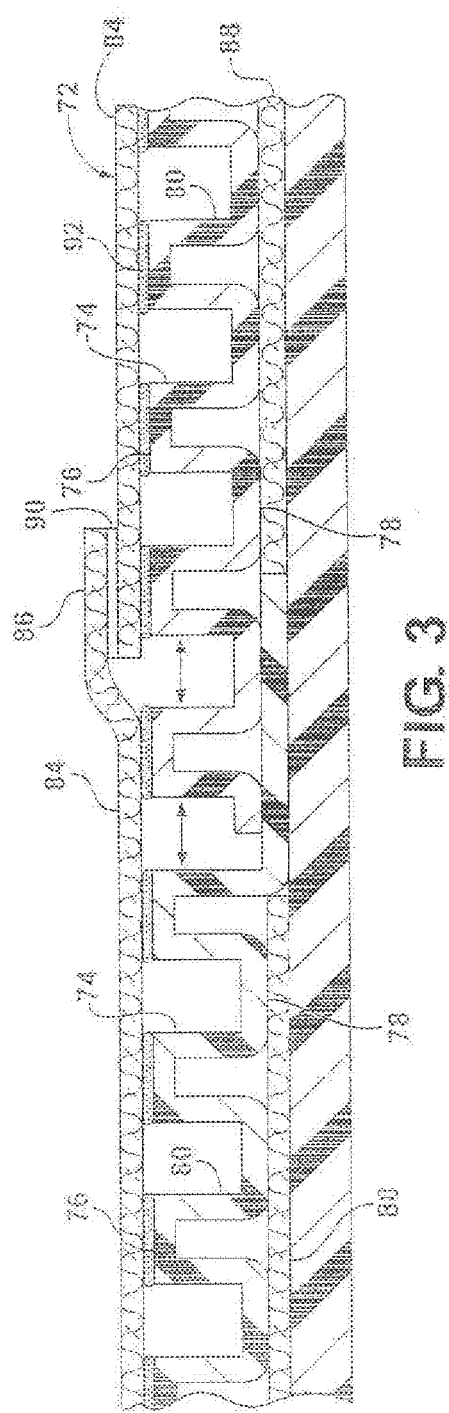
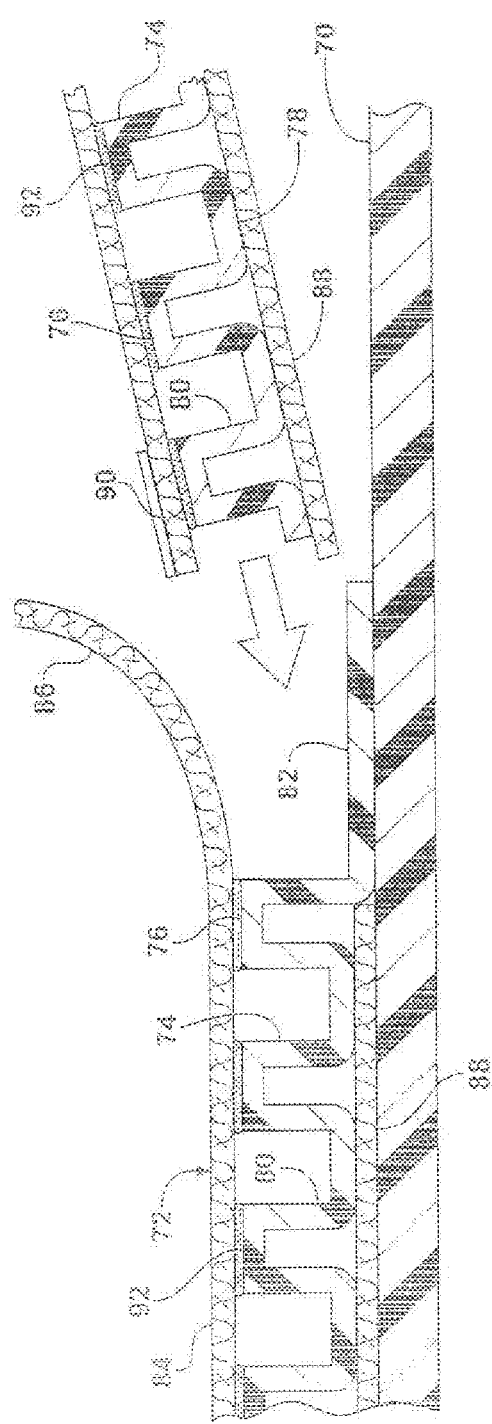

SHOCK ABSORBING ATHLETIC FIELD AND METHOD OF CONSTRUCTING SAME

CROSS-REFERENCE TO RELATED APPLICATION

This application is a continuation-in-part of the co-pending U.S. patent application Ser. No. 12/260,380, filed Oct. 29, 2008.

FIELD OF THE INVENTION

This invention relates to athletic fields and other types of recreational play areas and more particularly to an athletic field construction which is long lasting, weather resistant, resilient and has low maintenance requirements.

BACKGROUND OF THE INVENTION

Athletic fields have traditionally been characterized by natural turf surfaces which require watering and cutting as well as other types of maintenance. As a result, artificial turf fields have grown in popularity.

SUMMARY OF THE INVENTION

The present invention provides an artificial turf athletic field construction which is durable, attractive, suitable for many uses, uniform, user friendly and low in maintenance. In its simplest form, the field is created by placing multiple lengths of a prefabricated, rollable sheet-like material over a base foundation in laterally overlapping and conjoined relationship, and finishing the surface with artificial turf. In accordance with the invention, these lengths of material define the overall athletic/activity surface area and typically extend to a perimeter drain structure. The lengths are made up of a core material which may be economically manufactured by vacuum thermoforming to exhibit a dimpled or coined configuration characterized by non-coextensive lop and bottom surfaces joined by integral vertical walls.

In accordance with a preferred form of the invention described herein in detail, an edge flange is formed substantially continuously along one edge of the core material as an extension of the bottom surface. At least a top layer of impervious pliable sheet material is laid over and adhesively bonded to the top surfaces of the core material and is arranged to form a substantially continuous flap along the edge which overlies the edge flange of the core material. A strip of two-sided adhesive tape or the like is placed on top of the top layer along the edge opposite the flap so that two laterally adjacent lengths of said material may be laterally conjoined with one another by placing the bottom surface of one layer on the edge flange of the previously laid layer and sticking the flap down onto the top pliable sheet by means of the tape. The laterally conjoined layers, while bonded together on top, are preferably not bonded on the flap, and may, therefore, slide to accommodate thermal expansion and contraction.

In accordance with another aspect and/or embodiment of the invention, a layer of pliable water impervious material underlies the core material and overlies the base in such a way as to extend to the perimeter drain so as to direct water to the drain. This pliable may either be loose or it may be bonded to the lengths of core material as a bottom fabric layer. The pliable layers may be formed of what is commonly known as a "geotechnic" material which comprises randomly arranged fibers of synthetic material in a resin binder, typically on the order of 2 to 6 mils in thickness.

The resilient material layers are preferably made in 200 ft. lengths, are rolled up for shipment and storage, and easily unrolled in the course of constructing an athletic field or recreational surface area as described herein.

In accordance with another aspect of the invention, a method of constructing an athletic field over a base such as compacted gravel is provided. In accordance with this method, the base or foundation area is created, compacted and graded as desired for drainage purposes. A football field, for example, may be constructed so as to be crowned along the center and slightly lowered toward the sidelines for drainage. A peripheral drain structure, usually comprising perforated pipe in a crushed rock matrix, is constructed along or around at least part of the outside border of the area. Thereafter, lengths of construction material as described above are unrolled and placed in side-by-side, overlapping, conjoined relationship, the bonded joining being such as to be similar to shingles which shed water in a preferred direction created by the grading of the foundation. In one form, these lengths of material are overlapped and conjoined in side-by-side relationship until the top of the grade is reached whereupon the same sequence is begun from the opposite side of the field until the two structures meet along a center line. At that point, the center line seam may be taped and sealed with an impervious tape material. The rolled construction material is preferably made with regularly spaced expansion joints.

In accordance with a preferred form of the invention, the core material is ultimately overlaid with synthetic turf to create an attractive grass-like, low maintenance, wheelchair accessible surface which is user friendly for a variety of athletic purposes ranging from football and soccer to playground use.

BRIEF DESCRIPTION OF THE DRAWINGS

The description herein makes reference to the accompanying drawings wherein like reference numerals refer to like pails throughout the several views, and wherein:

FIG. 2 is a sectional view of another illustrative construction using a single resilient layer in a reliable synthetic construction material;

FIG. 3 is a detail of a joint or seam between adjacent lengths of the rollable synthetic construction material of FIG. 3; and FIG. 4 is a detail of the same joint before it is completed.

DETAILED DESCRIPTION OF THE EMBODIMENT

Figure 1:
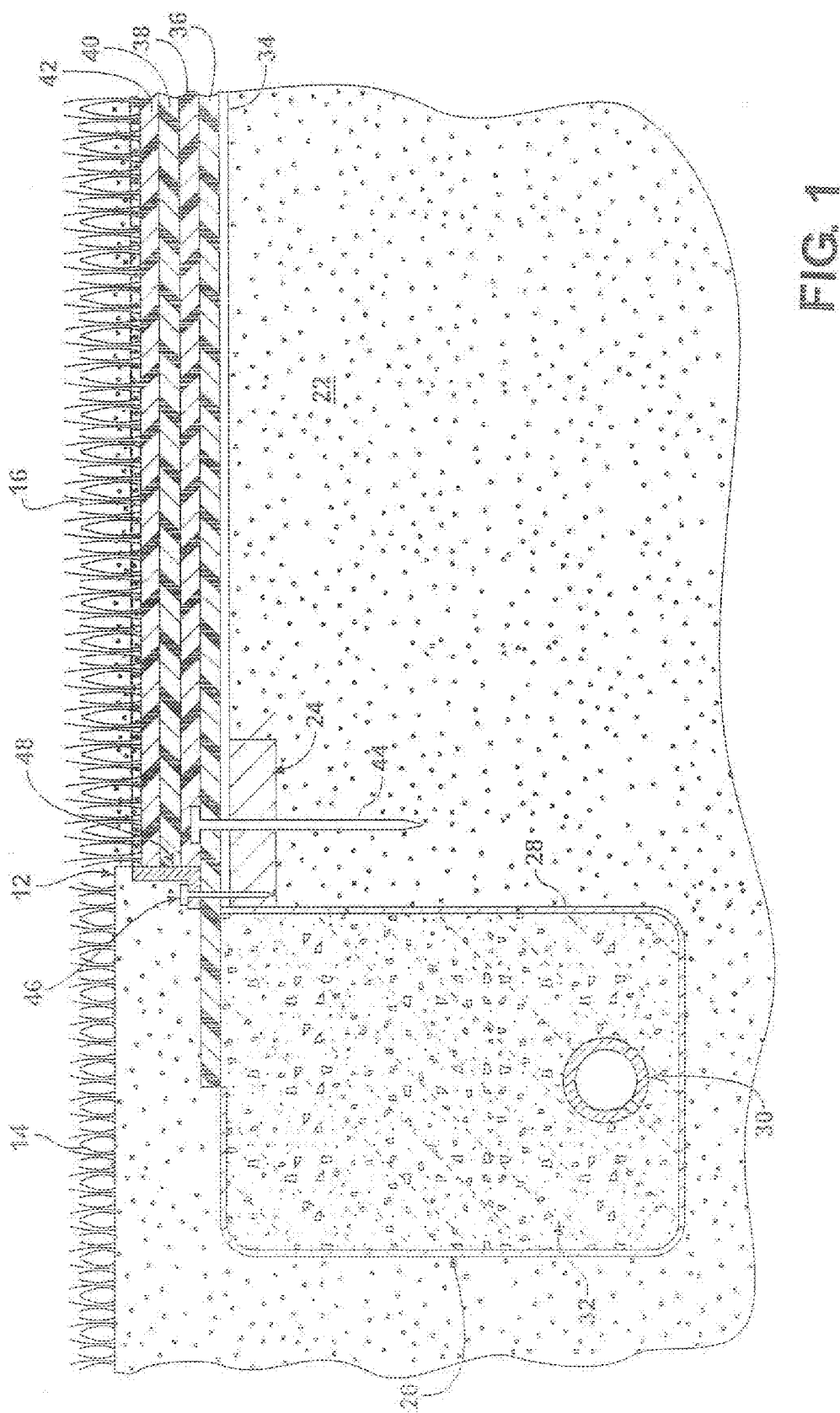
FIG. 1 is a sectional view of an illustrative construction using multiple resilient layers and a peripheral drain.

Referring to FIG. 1, a vertical sectional view along a perimeter illustrates in detail the structure of an athletic field having a perimeter 12 which meets an adjacent area of natural turf 14. This is merely illustrative as the entire area of a field may be synthetic turf.

The first step in the construction method is to define the area and to prepare a substantially level surface on a suitable base 22 which may be dirt, asphalt, concrete or other stable material. The base surface is preferably prepared in such as way as to be nearly flat but graded with a slope of between 0.5 and 1.0% toward the perimeter 12 for drainage purposes. A very large area with only natural perimeter boundaries may be graded from the center outward. Other areas may be graded in only one or two directions, particularly is they are located on a sloped section of ground and/or abut a natural boundary such as a wall or sidewalk.

The next step is to define at least a partial perimeter. The first step, which is sometimes optional, is to build a collector drain 26 which involves trenching below grade. More detail is provided below. An accompanying step is to lay into the base 22 a nailer strip 24 which, in this case, comprises a line of pressure treated 2 inch by 6 inch nailer boards laid end-to-end along and immediately within the interior side of the perimeter 12. A flat, continuous surface must be prepared for the boards. The use of these nailer boards naturally suggests a play area shape defined by straight lines but which may have jogs, curves or corners as is necessary to accommodate other natural or manmade features. In addition, the perimeter constructed in accordance with this specification may be only partial and may be integrated with other natural perimeter features such as walls, buildings, waterways or sidewalks. Plastic nailer strips may also be used, hi any event, the perimeter is flush with adjacent turf and presents no obstacle to wheelchairs and the like.

The collector drain 26 is approximately 20 inches deep and is lined with a filter fabric of woven polypropylene filaments forming a stable and durable network. This material is readily permeable to water, non-biodegradable and resistant to soil chemicals, acids and alkalis. It is commercially available in rolls.

The drain trench 26 is filled with natural or crushed stone 32 and contains perforated pipe 30 to convey water to a storm sewer or an adjacent waterway or a so-called French drain or simply a reservoir or ditch. The collector drain is then filled with washed natural and/or crushed stone with an average size of approximately ¾ inch.

The perimeter-defining nailer boards 24 are then placed along the side of the collector drain around as much of the perimeter 12 of the recreational surface as is required. While wood boards are satisfactory, other materials such as plastic may be used.

The next step is to place over the base a continuous layer 34 of impervious, thin polymeric material, typically referred to as a "geomembrane" which is approximately 20 mils in thickness. This layer 34 comes in rolls and is laid over the entirety of the surface area and spliced by tape as necessary. It runs over the nailer board 24 and is secured thereto by nails 46 which also runs through a restraint strip 48 for purposes hereinafter described. The strip 48 may be plastic and has an L-shaped cross-section. The geomembrane 34 is optional.

The next step is to overlay the impervious layer 34 with one or more layers of shock absorbing, synthetic material layers 36, 38, 40, 42, the bottommost layer 36 extending partially over the collector drain 26 as shown and fully over the nailer board 24. A spike 44 or similar fastener is used to secure the lowermost layer 36 to the nailer board 24. In this case, four layers of shock absorbing/attenuating material are shown giving a fall height safety factor of over 8 feet. Each layer is approximately ¾ inch thick and, although it may be of varying construction, is preferably itself a multilayer structure of which the center core is 42 mil polystyrene with conical dimples numbering approximately 325 per square foot. The dimples are ⅜ inch in diameter at the bases and 5/16 inch in diameter at the top and the tops of the dimples are flat. The outer layers which sandwich the polystyrene sheet are non-woven, polypropylene fabric glued to the tops of the dimples as well as to the bottom surface of the center core. These materials, along with the impervious layer 34 also help to convey water horizontally from the play area up the field to and beyond the collector drain 24. The layers 38, 40, 42 edge immediately up to and are held in place by the edge restraint strip 48 as shown.

Next, the entirety of the topmost layer 42 is overlaid with synthetic turf 16 which is preferably partially filled with a sand/rubber particulate material 49 to act as a ballast layer and also contribute to the shock absorbing character of the overall structure. A preferred synthetic turf is Radicci 69 oz. polyethylene and SF1 polypropylene with a pile height of about 1¾ inch and a weight of about 10 lbs. per linear foot in a 15 foot width. Seams are taped during installation;

As shown in FIG. 1, a surrounding area of natural turf 14 is graded to be essentially flush with the fill of the synthetic turf 16 at the perimeter 12 so as to create a natural integration or flow from the synthetic turf 16 to the natural turf 14.

In accordance with the invention, the number of layers of shock absorbing material may vary from one to four or more as required by the fall height requirements or standards. The base surface may, as described above, be of any of a number of suitable materials or combinations thereof. The grading may be accomplished by scraping a natural surface area down to a base layer or by simply flattening or preparing a base layer and grading the surrounding area of natural turf 14 up to it. The entire base may slope in one direction toward a collector drain or may be highest in the center and slope in all directions toward a surrounding perimeter 12. All synthetic materials used in the surface are completely recyclable. These and other variations will be apparent to those skilled in the art.

Referring now to FIGS. 2 through 4, an alternative form of the invention is described in greater detail. The structure comprises a foundation 60 of road stone compacted to a level of 96 Proctor which underlies the entirety of the activity area; i.e., the field, track of playscape area. The foundation 60 is bordered by a trench drain 62 comprising perforated plastic drain pipe 64 embedded in a matrix of crushed stone held in place by a water permeable synthetic liner 66. The trench drain 62 may extend entirely around the periphery of the foundation 60 or along only a portion of it as would be the case with, for example, a football or soccer field, wherein separate trench drains 62 would run along the sidelines. The depths of the foundation 60 and drain 62 may vary. In the illustration, it is assumed that the foundation and drain are formed in natural earth, but this may not always be the case.

A nailer board 68 runs along the inside surface of the trench drain 62. A drain blanket is provided by a layer 70 of 6 mil water impervious plastic which extends over the nailer board 68 to the trench drain 62. Placed atop the drain blanket layer 70 is a layer 72 of primary construction material which, in this case, is a pliable, reliable, synthetic material manufactured in widths of approximately four feet and lengths of approximately 200 feet, these dimensions being illustrative rather than limiting. The material 72 comprises a layer of core material 74 which is dimpled or coined polyethylene, which can be manufactured by feeding warm polyethylene sheet material onto a vacuum thermoforming roll which forms upwardly projecting cylindrical bodies having circular top surfaces 76 and a flat sheet-like bottom surface 78. The particular geometric configuration of the raised protuberances is not critical, the important feature being that the top and bottom surfaces 76, 78 are essentially non-coextensive. In this case, the protuberances are approximately 1¼ inches apart from center to center and the overall height of the material 74 is on the order of 7/16 inch. The top and bottom surfaces 76, 78 are joined by the cylindrical side walls 80 of the upwardly extending protuberances. A flange 82 of approximately 4 inches in width is formed along the right bottom side edge of the core material 74 for purposes to be described.

Bonded to the top surfaces and essentially coextensive with the material 74 is a layer 84 of geotechnic felt having a loose pliable flap 86 which overlies the flange 82 along the right edge as shown in FIGS. 3 and 4. In this embodiment, a similar bottom layer 88 of geotechnic felt is bonded to the bottom surface 78 and ends at the flange 82; i.e., it does not extend under the flange 82. Sprayed-on hot melt adhesive 92 is used to bond layers 84 and 88 to (he core material 74. A layer of two-sided tape 90 extends along the upper left side edge of the roll of material 72. When two adjacent layers are conjoined, the protective paper on top of the two-sided sticky tape 90 is removed and the layer is shoved onto the flange 82 with the flap 86 raised. When the right-hand layer is pushed fully into the left-hand layer so that the bottom layer of felt 88 overlies the flange 82, the flap 86 is pressed onto and bonded with the two-sided tape 90 to create a shingle effect which bonds the layers 72 together. It will be noted that they bonded only at the top surface; i.e., the lower layer 88 can slide over the flange 82 to accommodate thermal expansion and contraction. This process of conjoining adjacent layers of the construction material 72 is continued from left to right which also is from lower to higher in a graded field.

In the embodiment of FIG. 2, the low grade area corresponds with the trench drain 62 and the top surface of the foundation rises from left to right for drainage purposes. An edge strip 94 abuts the perimeter layers of material 72 and is held in place by a nail 94 which runs through both the bottom layer 88 of material and the 6 mil drain blanket 70.

An alternative to the structure shown in FIGS. 3 and 4 is to eliminate the lower layer 88 of geotechnical material. This effects a cost reduction but also reduces the sound deadening effects of the material layer 72. This may be important as stepping on the material 74 without the underlayer tends to produce a "crunching" sound which users may find undesirable.

After a sufficient number of layers of material 72 have been laid down and conjoined, the layers will eventually reach the top of a crowned field. At this time, the process is begun again at the opposite sideline but with the materials laid in the opposite order. The layers are then build up until they reach the crown at which time the adjacent sides of the left and light peak layers are taped to provide a water seal. Again, this is only one illustrative application as, for example, a playground or playscape area may be graded in only one direction, in which case the layers of material 72 are simply put into place from low to high with no reversal of the construction order as described above. The finishing touch is to add a layer 95 of artificial turf as shown and described with reference to FIGS. 1 and 2 above. It will be understood that the relative thickness of components in the Figures are not shown to scale or in the actual proportions to one another. For example, the adhesive layer 92 is shown much thicker than actual.

What is claimed is:

1. A rollable sheet-like athletic surface building material adapted to be joined in side-by-side parallel relation with additional lengths of the same material comprising:
    an elongate rollable sheet of resilient plastic core material having non-coextensive top and bottom surfaces joined by integral vertical walls and having left and right parallel edges;
    an edge flange formed substantially continuously along one edge as an extension of said bottom surface wherein said flange is on the order of four inches in width;
    a top layer of impervious pliable sheet material having left and right parallel edges, said layer being adhesively bonded to top surfaces of said plastic core material and forming a substantially continuous unbonded flap along the edge that overlies said flange; and
    a strip of adhesive material extending along the opposite edge of said top layer to receive and be adheringly bonded to the underside of said flap when two lengths of said surface building material are arranged and joined in parallel adjacent and overlapping relationship.

2. A structure as defined in claim 1 further comprising a layer of artificial turf overlying the top layer.

3. A construction as defined in claim 2 wherein the base is compacted stone.

4. A resilient and substantially impervious recreational and athletic surface constructed over a base layer at least partially surrounded by a perimeter drain comprising:
    a first layer of pliable impervious sheet material overlying said base and extending to said perimeter drain;
    a shock absorbing, water impervious layer overlying said first sheet layer and consisting of a plurality of rolled out, overlapping and laterally co-joined lengths of construction material, each of said lengths of construction material comprising an elongate rollable sheet of plastic core material having non-coextensive top and bottom surfaces joined by integral vertical walls and a substantially continuous edge flange formed along one edge as an extension of said bottom surface;
    each of said lengths of construction material further comprising a top layer of impervious pliable sheet material bonded to said top surfaces and forming a substantially continuous flap along an edge overlying said flange thereby to accommodate a non-flanged edge of an adjacent length of construction material between the flange and said flap; and
    a strip of adhesive material joining the underside of said flap on one length to the top surface of the top layer of the laterally adjacent length.

5. A rollable, sheet-like length of pliable core material for use in building recreational surfaces comprising:
    a layer of pliable multi-planar synthetic material having spaced-apart, non-continuous top and bottom surfaces joined by intermittent walls extending integrally between the top and bottom surfaces;
    the bottom surfaces forming an edge flange which runs laterally along an edge of said length; and
    a layer of impervious geotechnic felt adhesively bonded to the top surface and extending loosely out over said flange to form a flap,
    whereby a second length of said material may be laterally spliced to said length by placing a lateral edge of said second length between said flange and said flap and bonding said flap to the top surface of the second length.

* * * * *